United States Patent [19]
Makosch

[11] Patent Number: 5,392,116
[45] Date of Patent: Feb. 21, 1995

[54] INTERFEROMETRIC PHASE MEASUREMENT

[75] Inventor: Guenter Makosch, Sindelfingen-Maichingen, Germany

[73] Assignee: International Business Machines Corporation, Armonk, N.Y.

[21] Appl. No.: 30,941

[22] Filed: Mar. 12, 1993

[30] Foreign Application Priority Data

Mar. 17, 1992 [EP] European Pat. Off. ............ 92104558

[51] Int. Cl.⁶ ............................................. G01B 9/02
[52] U.S. Cl. .................................... 356/351; 356/357; 356/359
[58] Field of Search ............... 356/351, 354, 357, 359, 356/360, 355, 358

[56] References Cited

U.S. PATENT DOCUMENTS

| | | |
|---|---|---|
| 4,298,283 | 11/1981 | Makosch et al. ............... 356/351 |
| 4,358,201 | 11/1982 | Makosch ......................... 356/358 |
| 4,707,137 | 11/1987 | Lee ................................ 356/359 |
| 4,714,348 | 12/1987 | Makosch ......................... 356/351 |
| 4,844,616 | 7/1989 | Kulkarni et al. ................. 356/358 |
| 5,235,405 | 8/1993 | Sillitto et al. .................... 356/354 |

FOREIGN PATENT DOCUMENTS

| | | |
|---|---|---|
| 0481356 | 4/1992 | European Pat. Off. ............ 356/351 |
| 1-109718 | 4/1989 | Japan ............................ 356/400 |

*Primary Examiner*—Rolf Hille
*Assistant Examiner*—Minhloan Tran
*Attorney, Agent, or Firm*—James M. Leas

[57] ABSTRACT

A phase measuring method and apparatus are described for determining the phase difference between two polarized light beams which, in contrast to prior phase measuring techniques, permits simultaneous signal evaluation. The orthogonally polarized light beams with the phase difference are initially split by a beam splitter into several partial beam pairs which, by means of a lens are focused as parallel beams into a phase shifter, a polarizer, and an array of light sensors. Phase differences of the light beams create intensity differences between the beams received by the different light sensors. High measuring speed and accuracy are thus provided. When combined with means for directing two spaced orthogonally polarized beams on a surface, the method and apparatus can be used to determine height differences along the surface.

43 Claims, 2 Drawing Sheets

INTERFEROMETRIC PHASE MEASUREMENT

FIELD OF THE INVENTION

The invention lies in the field of optical measuring devices. It concerns in particular interferometer arrangements that detect the phase differences between differently polarized light beams.

BACKGROUND OF THE INVENTION

Digital interferometers are being increasingly used in a number of production processes to characterize and measure surfaces. Optical measuring devices of this kind are distinguished by a high degree of measuring accuracy. For manufacturing, it is desirable to make measurements without contacting the measured part to avoid damage. It is also desirable that measurements be fully automated.

A measuring device of this kind is the Laser Spot Scanning Interferometer (LASSI) described in U.S. Pat. No. 4,298,283 assigned to the assignee of the present invention, incorporated herein by reference. The underlying measuring principle is based on scanning the surface to be tested with two laser light beams which are simultaneously focused adjacent to each other onto the surface. During this process, the optical phase difference between the two light waves, which are reflected from the surface, changes linearly as a function of the height difference between the two laser spots on the surface. The phase difference is determined by phase switching. For this purpose, an electro-optical light modulator is used which periodically shifts the phase difference between the two light waves by a fixed amount. At the same time, the intensity of the two interfering light beams is measured by a photodiode. With $P_S$, $P_R$ and $P_T$ being the light powers measured for the phase shift values $\phi = 0, \pm \frac{2}{3}$, the phase difference to be measured $$\phi_M = \frac{4\pi}{\lambda} h, \tag{1}$$

where
 $\lambda$ is the light wavelength and
 h is the height difference,
is determined according to the following equation:

$$\phi_M = \tan^{-1}\left[\frac{\sqrt{3}\ (P_R - P_T)}{2P_S - P_R - P_T}\right] \bmod 2\pi. \tag{2}$$

The phase measuring value $\phi_M$ is calculated according to that equation, using, for example, a personal computer controller.

The above described phase measuring method provides the exact phase measuring value $\phi_M$ and thus the height difference value h to be determined, provided that the modulation voltage at the modulator shifts the phase periodically by $\pm \frac{2}{3}\pi$. However, in practice, this switching voltage is not constant. Similar to the half-wave voltage of the modulator, the switching voltage, depending upon the ambient temperature, is subject to slight variations which may exceed 5% of the rated voltage. To reduce errors resulting therefrom during phase measurement to a minimum, the half-wave voltage frequently has to be redefined by an automatic calibration routine. Another error, attributable to the sequential processing of the measuring value, occurs when a rapidly changing phase measuring value is dynamically determined. In a phase measuring process, the measuring time of the three light power values $P_S$, $P_R$ and $P_T$ is several milliseconds. During this time, the phase value $\phi_M$ to be measured must remain unchanged. For scanning profile height measurements, this may be achieved by a correspondingly slow lateral movement of the measuring object. However, in the case of unforeseeable rapid phase changes, such errors and their effect cannot be avoided.

SUMMARY OF THE INVENTION

The present invention improves upon the phase detection of the prior art. An object is to develop an improved optical phase measurement that eliminates the disadvantages of the existing measuring techniques, avoids sequential processing, and provides simultaneous measurement of the needed measuring values.

The method and arrangement for phase measurement according to the present invention permits parallel signal input and signal processing. For this purpose, differently polarized light beams are initially split by a beam splitter into several partial beams or divided into several diffraction orders by a diffraction grating. Then, using, for example, a lens, these diffraction orders are focused preferably as laterally displaced parallel light beams onto light sensitive sensors. A phase shifter and a polarization filter are arranged between the lens and the sensors. With the aid of the phase shifter, the phases of the individual parallel beams are each shifted differently depending upon their position and polarization.

By passing the beams through a polarization filter phase differences between the partial beams lead to interference and therefore intensity changes of the parallel beams which are detected by the sensors. The phase difference of the light beams is directly derivable from the simultaneously recorded intensity pattern of the partial beams.

In addition to a high measuring speed, the phase measuring method according to the invention has a high measuring accuracy and permits a compact design of the phase measuring apparatus.

Applications include step and profile height measurements in the nanometer range as well as measurements of minimum displacements in one plane (alignment and overlay measurements).

BRIEF DESCRIPTION OF THE DRAWINGS

The phase measuring method according to the invention is described in detail below by way of a preferred embodiment of a measuring arrangement for step and profile height measurement with reference to drawings, in which.

DETAILED DESCRIPTION OF THE INVENTION

Figure 1:
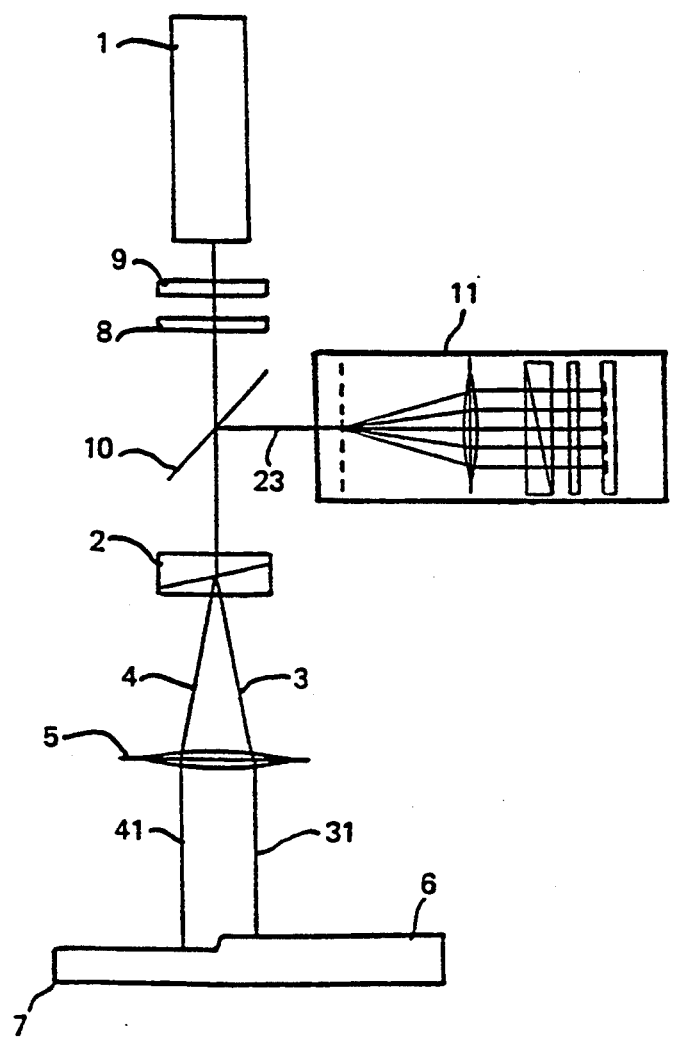
FIG. 1 is a schematic diagram of a surface height measuring device with parallel signal evaluation.

Upon passing a Wollaston prism 2, the beam of a linearly polarized laser 1 is split into two light beams 3 and 4 polarized perpendicularly to each other, which, by means of the lens 5, are focused as two parallel light beams 31 and 41 onto the surface 6 of the object 7 to be measured. With the aid of a continuous light attenuator consisting of a polarizer 8 and a rotatable half-wave plate 9, the absolute and the relative light intensity of the two light beams my be suitably changed. Upon reflection at the surface 6, an optical phase difference $\phi_M$ occurs between the two light beams, which, according to equation (1) is directly proportional to the height difference h between the laser light spots on the surface. After reflection, the beams are recombined by the Wollaston prism without changing their directions of polarization and reflected at the beam splitting mirror 10 in one superimposed light beam 23 in the detector arm 11 of the arrangement.

Figure 2:
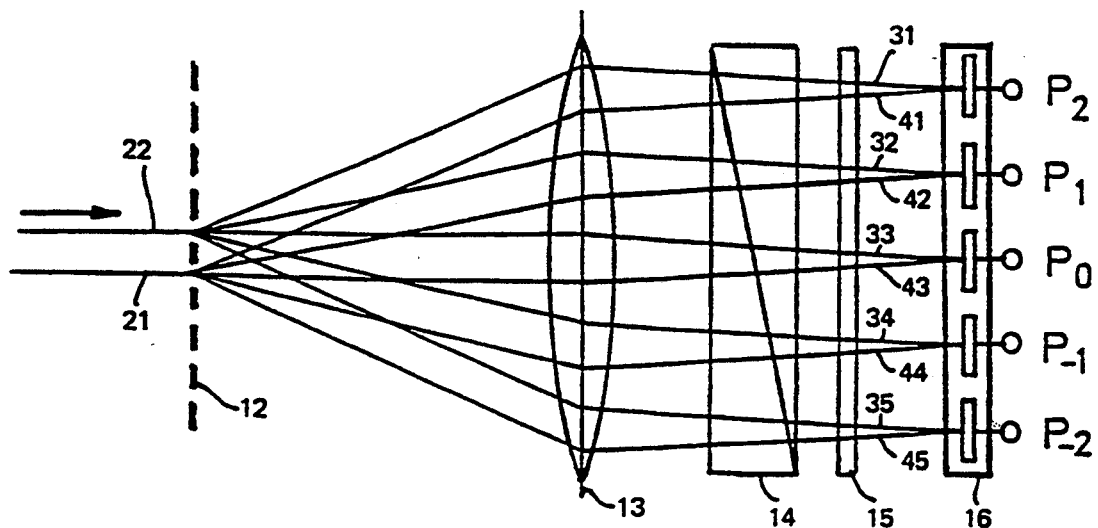
FIG. 2 shows the design of the optical phase detector according to the invention.

In FIG. 2, beams 21 and 22 are not two separate beams but are a superposition of two reflected and recombined light beams as described above, and also are the border lines of incident superimposed light beam 23. Similarly 31 and 41 is a diffraction order of superimposed light beam 23 and are the border lines of the light cone converging on the detector 16. According to the phase measuring method proposed herein, the phase difference between the partial beams of the reflected light beam pair (21, 22) of which incident superimposed light beam 23 consists, is determined by means of the measuring arrangement schematically illustrated in FIG. 2. This arrangement comprises a transmission diffraction grating 12 dividing incident superimposed light beam (23) into several pairs of diffraction orders (31, 41), (32, 42) (33, 43), (34, 44), (35, 45) each of which is a superposition of the diffraction orders of two reflected light beams as described above; a lens 13 focusing the diffraction orders as axially parallel equidistant light beams onto a line detector 16; the polarizer 15, and a phase shifting optical element 14.

Figure 3:
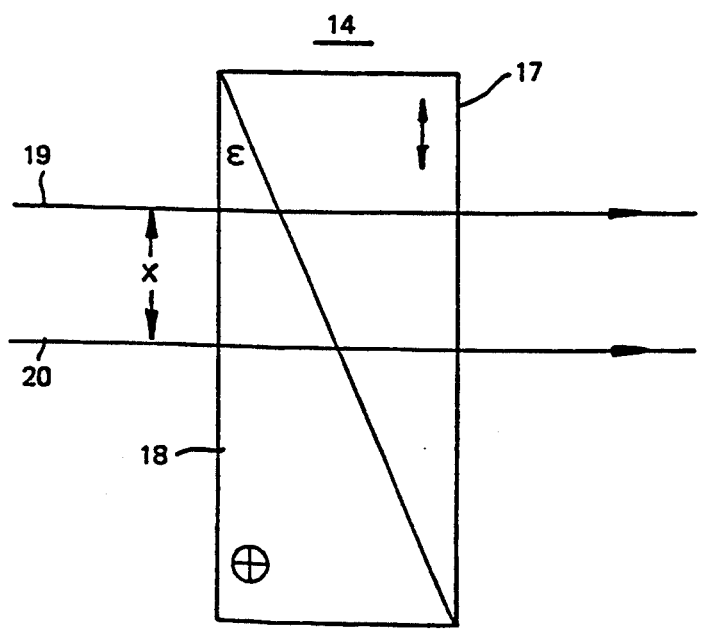
FIG. 3 is an example of the phase shifter used in the phase detector.

This phase shifter 14 is designed on the principle of the Babinet compensator (FIG. 3). It consists of two birefringent wedge plates 17, 18 making up a plane parallel plate. The optical axes of the two wedge plates are perpendicular to each other, extending parallel to the boundary faces of the plate. Two partial waves of a laser beam polarized perpendicularly to each other are subject to a path or phase difference by passing through the two wedges as given by $$\phi = \frac{4\pi}{\lambda} (n_e - n_0) x \tan \epsilon \qquad (3)$$

where
$\lambda$ is the light wavelength,
$n_o, n_e$ are the refraction indices of the ordinary or the extraordinary beam in the crystal,
x is the distance from the plate center, and
$\xi$ is the prism angle of the wedge plates 17, 18.

Each of the diffraction orders passing the phase shifter 14 in the above described arrangement consists of two perpendicularly polarized partial components, the phase difference of which is $\phi_M$. Depending upon the position x at which the diffraction orders traverse the plate, the two components are additionally phase shifted by $\phi$ to each other, as defined by equation (3). The phase increment between two adjacent pairs of diffraction orders 19, 20 is constant, as the diffraction orders are equidistant. By suitably selecting the prism angle $\xi$, the phase increment may be determined to be $\pi/2$ for a given spacing of the diffraction orders. Assuming the zeroth diffraction order traverses the phase shifting plate at its center, x=0, and thus is not phase shifted, the two partial components of the $-2$nd diffraction order are phase shifted by $-\pi$ to each other, those of the $-1$st diffraction order by $\pi/2$, and those of the $+1$st and the $+2$nd by $\pi/2$ and $\pi$, respectively. After the diffraction orders have passed the polarizer oriented at 45° to their oscillation direction, their light powers measured by the linear array detector are given by the following equations:

$$P_{-2} = K_2 (A + B \cos(\phi_M - \pi)) \qquad (4)$$

$$P_{-1} = K_1 \left( A + B \cos\left(\phi_M - \frac{\pi}{2}\right) \right)$$

$$P_0 = A + B \cos \phi_M$$

$$P_1 = K_1 \left( A + B \cos\left(\phi_M + \frac{\pi}{2}\right) \right)$$

$$P_2 = K_2 (A + B \cos(\phi_M + \pi))$$

where A, B are constant powers and $K_1$, $K_2$ are grating-specific factors of proportionality which define the ratio of the light powers in the first and the second diffraction order relative to the zeroth diffraction order.

By means of these power values which are simultaneously measured at the five associated diodes of the line detector 16 the phase difference $\phi_M$ may be determined as follows:

$$\phi_M = \tan^{-1} \left[ \frac{K_2}{K_1} \frac{(2P_{-1} - P_1)}{(2K_2 P_0 - P_2 - P_{-2})} \right] \mod 2\pi \qquad (5)$$

In contrast to the previously used phase switching technique which calculates the phase difference to be measured from three sequentially measured phase shifted power signals, the method according to the invention permits a parallel recording of several phase shifted intensity signals. These signals were in the prior art generated in a time staggered fashion by periodically switching the electro-optical modulator and thus had to be sequentially processed. The method of the present invention, by contrast, generates the necessary individual signals simultaneously, so that they may be processed in parallel. This enhances the measuring speed and measuring reliability. By using more than three characteristic values, the measuring accuracy is further improved. Generally, other phase switching techniques based on sequential signal processing may be converted into parallel methods. Thus, for example, the previously used sequential measuring process may be replaced by a parallel method which is identical in form if the phase shift between the zeroth and the two first diffraction orders is $\pm \frac{2}{3}\pi$. The powers of the three diffraction orders are given in this case by:

$$P_{-1} = K_1 \left( A + B \cos\left(\phi_M - \frac{2\pi}{3}\right) \right) \qquad (6)$$

$$P_0 = A + B \cos \phi_M$$

$$P_1 = K_1 \left( A + B \cos\left(\phi_M + \frac{2\pi}{3}\right) \right).$$

By means of these measured power signals, the phase difference may be determined as follows:

$$\phi_M = \tan^{-1}\left[\frac{\sqrt{3}\,(P_1 - P_{-1})}{2P_0 K_1 - P_1 - P_{-1}}\right] \bmod 2\pi \quad (7)$$

This formula is identical to equation (2) with $$P_O K_1 = P_s,\ P_1 = P_R\ \text{und}\ P_{-1} = P_T.$$

A method confined to a minimum number of three defining equations is inferior to the above discussed method with five such equations, as the inaccuracies decrease as the number of power signals increase.

While the invention has been described in detail herein and illustrated in the accompanying drawings, it will be evident that various further modifications are possible without departing from the scope of the invention.

What is claimed is:

1. A method of interferometrically determining the phase differences between differently polarized light beams, comprising the steps of:
    a) splitting said differently polarized light beams into at least three pairs of partial beams;
    b) phase shifting each of said partial beams in each of said pairs of partial beams, wherein said partial beams are individually phase shifted to create a phase difference between the two differently polarized partial beams of each of said pairs, with the respective phase differences of adjacent pairs of said partial beams differing by a specified amount;
    c) passing said phase shifted partial beams through a polarizer to cause said partial beams of each said pair to interfere with each other; and
    d) measuring the intensifies of each of said pairs of interfering partial beams.

2. A method as recited in claim 1, comprising an additional step between steps (a) and (b) of aligning said pairs of partial beams such that they extend in pairs parallel to and equidistantly from each other.

3. A method as recited in claim 1, wherein in said phase shifting step (b) said specified amount is a constant amount.

4. A method as recited in claim 3, wherein said constant amount of phase difference of adjacent pairs of partial beams is $\pi/2$.

5. A method as recited in claim 1, wherein each of at least three of said pairs of interfering partial beams is focused onto an optical sensor.

6. A method as recited in claim 5, wherein at least three of said optical sensors, one for each of said pairs of interfering partial beams, generate electrical signals and said signals are processed by a controller to determine the phase difference of said differently polarized light beams.

7. A method as recited in claim 1 wherein a diffraction grating is used to split said differently polarized light beams.

8. A method as recited in claim 7, wherein said diffraction grating is a transmission grating.

9. A method as recited in claim 1, wherein a Babinet compensator is used in said step of phase shifting.

10. A method for interferometrically measuring the height of structures on the surface of an object, comprising the steps of:
    a) splitting light from a light source into two parallel, differently polarized beams;
    b) focusing said beams onto said surface to be measured;
    c) recombing the beams reflected from said surface into a single beam comprising a pair of differently polarized partial beams;
    d) splitting said reflected pair of partial beams into at lease three pairs of partial beams;
    e) phase shifting each of said partial beams in each said pair, wherein said partial beams are individually phase shifted to create a phase difference between the two differently polarized partial beams of each of said pairs, with the respective phase differences of adjacent pairs of said partial beams differing by a specified amount;
    f) passing said phase shifted partial beams through a polarizer to cause said partial beams of each pair to interfere with each other; and
    g) measuring the intensifies of each of said pairs of interfering partial beams.

11. A method as recited in claim 10, comprising an additional step between steps (d) and (e) of aligning said pairs of partial beams such that they extend in pairs parallel to and equidistant from each other.

12. A method as recited in claim 10, wherein in said phase shifting step (e) said specified amount is a constant amount.

13. A method as recited in claim 12, wherein said constant amount of phase difference of adjacent pairs of partial beams is $\pi/2$.

14. A method as recited in claim 10, wherein each of at least three of said pairs of interfering partial beams is focused onto an optical sensor.

15. A method as recited in claim 14, wherein at least three of said optical sensors, one for each of said pairs of interfering partial beams, generate electrical signals and said signals are processed by a controller to determine the phase difference of said differently polarized light beams.

16. A method as recited in claim 10 wherein a diffraction grating is used to split said differently polarized reflected light beams.

17. A method as recited in claim 10, wherein said diffraction grating is a transmission grating.

18. A method as recited in claim 10, wherein a Babinet compensator is used as the phase shifting element.

19. A method as recited in claim 10, wherein a plurality of measurements of said surface are recorded as said focused beams scan said surface.

20. An optical phase detector for determining a phase difference between mutually orthogonal partial beams of an incoming signal comprising:
    a diffraction grating that divides said incoming signal into at least three diffraction orders;
    means for shifting the phase of the partial beams in said at least three diffraction orders, wherein said means for phase shifting shifts the phase of said partial beams by different amounts such that phase differences between partial beams of adjacent diffraction orders differ by a specified amount;
    a polarizer orientated so phase shifted components of both of said partial beams in said at least three diffraction orders can pass and interfere; and
    at least three light sensitive sensors, each positioned to receive interfering components from said polarizer of one of said diffraction orders.

21. An optical phase detector as recited in claim 20, further comprising a lens positioned to direct said at least three diffraction orders onto said light sensitive sensors through said phase shifter and said polarizer.

22. An optical phase detector as recited in claim 21 wherein said lens aligns said at least three diffraction orders such that they extend parallel to and equidistant from each other.

23. An optical phase detector as recited in claim 20 wherein said diffraction grating is a beam splitter and said diffraction orders are partial beams formed by said beam splitter.

24. An optical phase detector as recited in claim 20, wherein in said phase shifting step said specified amount is a constant amount.

25. An optical phase detector as recited in claim 24 wherein said constant amount is $\pi/2$.

26. An optical phase detector as recited in claim 20 wherein said light sensitive sensors generate electrical signals and said signals are processed by a controller such that said phase difference of said differently polarized light beams is determined.

27. An optical phase detector as recited in claim 20 wherein said diffraction grating is a transmission grating.

28. An optical phase detector as recited in claim 20 wherein said phase shifting means comprises a Babinet compensator.

29. An optical phase detector as recited in claim 20 wherein said light sensitive sensors comprise diodes.

30. An interferometric phase measurement apparatus comprising:
    means for generating a coherent light beam;
    means for splitting said beam into two spaced partial beams polarized orthogonally to each other;
    means for directing said spaced partial beams onto a surface;
    means for recombining portions of said beams reflected from said surface into a corresponding recombined beam comprising a pair of differently polarized partial beams;
    a diffraction grating positioned to receive said recombined beam and divide said recombined beam into at least three diffraction orders;
    means for shifting the phase of said differently polarized partial beams in said at least three diffraction orders, wherein said means for phase shifting shifts the phase of said partial beams by different amounts such that phase differences between partial beams of adjacent diffraction orders differ by a specified amount;
    a polarizer oriented to cause components of both of said phase shifted partial beams in said at least three diffraction orders to pass and interfere; and
    at least three light sensitive sensors, each positioned to receive interfering components of one of said diffraction orders from said polarizer.

31. A measurement apparatus as recited in claim 30 wherein said means to split said beam comprises a Wollaston prism.

32. An apparatus as recited in claim 30 further comprising a lens providing means to direct said at least three diffraction orders onto said light sensitive sensors.

33. An apparatus as recited in claim 32 wherein said lens aligns said at least three diffraction orders such that they extend parallel to and equidistantly from each other.

34. An apparatus as recited in claim 30, wherein in said phase shifting step said specified amount is a constant amount.

35. An apparatus as recited in claim 34 wherein said constant amount is $\pi/2$.

36. An apparatus as recited in claim 30 wherein said light sensitive sensors generate electrical signals and said signals are processed by a controller such that the phase difference between the differently polarized partial beams of the recombined beam is determined.

37. An apparatus as recited in claim 30 wherein said diffraction grating is a transmission grating.

38. An apparatus as recited in claim 30 wherein said phase shifting means is a Babinet compensator.

39. An apparatus as recited in claim 30 wherein said light sensitive sensors are diodes.

40. An apparatus as recited in claim 30 further comprising means to scan said spaced partial beams across said surface.

41. An optical phase detector as recited in claim 40 wherein said beams are scanned in a direction along a line connecting said beams.

42. An optical phase detector as recited in claim 40 wherein said beams are scanned in a direction perpendicular to a line connecting said beams.

43. An apparatus as recited in claim 40 wherein said light sensitive sensors generate electrical signals and said signals are processed by a controller such that the phase difference between said differently polarized partial beams of the recombined beam is determined at selected points or continuously as said spaced partial beams are scanned across said surface.

* * * * *